(12) United States Patent
Jiang et al.

(10) Patent No.: US 9,920,606 B2
(45) Date of Patent: *Mar. 20, 2018

(54) PREPARATION METHOD, FORMULATION AND APPLICATION OF CHEMICALLY RETARDED MINERAL ACID FOR OILFIELD USE

(71) Applicant: Schlumberger Technology Corporation, Sugar Land, TX (US)

(72) Inventors: Li Jiang, Katy, TX (US); Mohan Kanaka Raju Panga, Sugar Land, TX (US); Christopher Scot Daeffler, Houston, TX (US); Olga Vladimirovna Nevvonen, Houston, TX (US); Merlyn Xavier Pulikkathara, Cypress, TX (US); Sergey Makarychev-Mikhailov, Richmond, TX (US); Jack Li, Sugar Land, TX (US); Annie Yi Sun, Copley, OH (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/824,362

(22) Filed: Aug. 12, 2015

(65) Prior Publication Data
US 2015/0344771 A1 Dec. 3, 2015

Related U.S. Application Data

(63) Continuation-in-part of application No. 13/955,394, filed on Jul. 31, 2013, now Pat. No. 9,573,808, and a
(Continued)

(51) Int. Cl.
E21B 43/25 (2006.01)
C09K 8/74 (2006.01)
(Continued)

(52) U.S. Cl.
CPC ............... *E21B 43/25* (2013.01); *C01B 7/01* (2013.01); *C09K 8/74* (2013.01); *C09K 8/86* (2013.01); *C09K 8/54* (2013.01)

(58) Field of Classification Search
None
See application file for complete search history.

(56) References Cited

U.S. PATENT DOCUMENTS 556,669 A 3/1896 Frasch
2,185,864 A 1/1940 Muskat et al.
(Continued)

FOREIGN PATENT DOCUMENTS

CN 102828734 A 12/2012
CN 103333673 A 10/2013
(Continued)

OTHER PUBLICATIONS

Office Action issued in Chinese Patent Application No. 201410558608.6 dated Mar. 1, 2017; 18 pages (with English translation).
(Continued)

*Primary Examiner* — Anuradha Ahuja
(74) *Attorney, Agent, or Firm* — Michael L. Flynn; Rachel E. Greene; Robin Nava

(57) ABSTRACT

An aqueous composition comprising a mineral acid, a fixing agent and water present in an amount sufficient to dissolve the mineral acid and the fixing agent. The fixing agent comprises at least one of an amine and/or an amide containing compound having a dipole moment of at least 3 when in the aqueous composition.

10 Claims, 2 Drawing Sheets

Related U.S. Application Data continuation-in-part of application No. 14/062,291, filed on Oct. 24, 2013.

(51) Int. Cl.
*C01B 7/01* (2006.01)
*C09K 8/86* (2006.01)
*C09K 8/54* (2006.01)

(56) References Cited

U.S. PATENT DOCUMENTS

| | | |
|---|---|---|
| 2,250,379 A | 7/1941 | Johnson |
| 2,250,474 A | 7/1941 | Eisenbrand et al. |
| 2,485,529 A * | 10/1949 | Cardwell ............... C23G 1/04 510/263 |
| 2,860,106 A | 11/1958 | Little et al. |
| 3,826,312 A | 7/1974 | Richardson et al. |
| 3,892,275 A | 7/1975 | Lybarger et al. |
| 3,920,566 A | 11/1975 | Richardson et al. |
| 3,920,591 A | 11/1975 | Jacobs et al. |
| 3,936,316 A | 2/1976 | Gulla |
| 3,953,340 A | 4/1976 | Templeton et al. |
| 3,953,352 A | 4/1976 | Mizutani et al. |
| 3,963,650 A | 6/1976 | Ogden |
| 4,094,957 A | 6/1978 | Guido et al. |
| 4,116,664 A | 9/1978 | Jones |
| 4,151,098 A | 4/1979 | Dill et al. |
| 4,315,763 A | 2/1982 | Stoller et al. |
| 4,420,414 A * | 12/1983 | Valone ............... C10M 133/04 106/14.15 |
| 4,428,432 A | 1/1984 | Pabley |
| 4,466,893 A | 8/1984 | Dill |
| 4,487,265 A | 12/1984 | Watanabe |
| 4,567,946 A | 2/1986 | Watanabe |
| 4,648,456 A | 3/1987 | Lamb et al. |
| 4,673,522 A | 6/1987 | Young |
| 4,675,120 A | 6/1987 | Martucci |
| 4,753,746 A | 6/1988 | Mesmer et al. |
| 4,807,703 A | 2/1989 | Jennings, Jr. |
| 4,830,766 A | 5/1989 | Gallup et al. |
| 5,120,471 A * | 6/1992 | Jasinski ............... C09K 8/54 252/389.54 |
| 5,616,151 A | 4/1997 | Sargent et al. |
| 5,650,633 A | 7/1997 | Ahmed et al. |
| 5,672,279 A | 9/1997 | Sargent et al. |
| 5,708,107 A | 1/1998 | Ahmed et al. |
| 5,763,610 A | 6/1998 | Ahmed et al. |
| 5,789,610 A | 8/1998 | Bowen |
| 5,855,244 A | 1/1999 | Ahmed et al. |
| 5,883,210 A | 3/1999 | Ahmed et al. |
| 5,919,375 A | 7/1999 | Sargent et al. |
| 5,922,653 A | 7/1999 | Ahmed et al. |
| 5,990,051 A * | 11/1999 | Ischy ............... E21B 43/261 166/294 |
| 6,051,670 A | 4/2000 | Ahmed et al. |
| 6,117,364 A * | 9/2000 | Vorderbruggen ....... C09K 8/54 252/395 |
| 6,340,660 B1 | 1/2002 | Gatsgaber |
| 6,365,121 B1 | 4/2002 | Wurmbauer |
| 6,425,947 B1 | 7/2002 | Berlin et al. |
| 6,436,880 B1 * | 8/2002 | Frenier ............... C09K 8/52 507/131 |
| 6,793,905 B1 | 9/2004 | Buttner et al. |
| 7,029,553 B1 | 4/2006 | Williams et al. |
| 7,357,879 B2 | 4/2008 | Takahashi et al. |
| 7,534,754 B2 | 5/2009 | Netherton |
| 7,547,665 B2 | 6/2009 | Welton et al. |
| 7,621,334 B2 | 11/2009 | Welton et al. |
| 7,658,805 B2 | 2/2010 | Netherton |
| 7,915,205 B2 * | 3/2011 | Smith ............... C09K 8/74 166/307 |
| 7,938,912 B1 | 5/2011 | MacDonald |
| 8,003,577 B2 | 8/2011 | Li et al. |
| 8,092,555 B2 | 1/2012 | Hertz et al. |
| 8,101,664 B2 | 1/2012 | Silverando |
| 8,163,092 B2 | 4/2012 | Baniel et al. |
| 8,163,102 B1 * | 4/2012 | MacDonald ............ C11D 1/72 134/22.1 |
| 8,269,037 B2 | 9/2012 | Vorberg et al. |
| 8,430,971 B1 | 4/2013 | MacDonald |
| 8,940,106 B1 * | 1/2015 | MacDonald ............ C11D 1/62 134/36 |
| 2006/0142166 A1 | 6/2006 | Thomas |
| 2007/0235189 A1 * | 10/2007 | Milne ............... C09K 8/74 166/280.1 |
| 2007/0289640 A1 | 12/2007 | Kirchner et al. |
| 2009/0247431 A1 * | 10/2009 | Gupta ............... C09K 8/74 507/237 |
| 2010/0282236 A1 | 11/2010 | Xiao et al. |
| 2011/0124533 A1 | 5/2011 | Notte et al. |
| 2012/0138299 A1 | 6/2012 | Joseph et al. |
| 2012/0238479 A1 * | 9/2012 | Choudhary ............ C09K 8/54 507/204 |
| 2013/0261032 A1 * | 10/2013 | Ladva ............... C09K 8/00 507/131 |
| 2014/0041690 A1 | 2/2014 | MacDonald, II et al. |
| 2014/0116708 A1 * | 5/2014 | Wadekar ............... C09K 8/74 166/307 |
| 2014/0374107 A1 | 12/2014 | Reyes et al. |
| 2015/0114647 A1 | 4/2015 | Li et al. |
| 2015/0344771 A1 | 12/2015 | Jiang et al. |

FOREIGN PATENT DOCUMENTS

| | | |
|---|---|---|
| CN | 103387518 A | 11/2013 |
| EP | 123066 B1 | 10/1988 |
| EP | 1136529 A1 | 9/2001 |
| EP | 1886976 A1 | 2/2008 |
| HU | 195241 B1 | 4/1988 |
| RU | 2106488 C1 | 3/1998 |
| WO | 2009086954 A1 | 7/2009 |
| WO | 2012075091 A2 | 6/2012 |
| WO | 2012076841 A1 | 6/2012 |
| WO | 2013064823 A1 | 5/2013 |
| WO | 2013140402 A1 | 9/2013 |

OTHER PUBLICATIONS

Scherrer, "On the combination of Urea with the Hydracids", Jan. 14, 1843, The Chemical Gazette vol. I, No. VI, pp. 141-145.
Examination Report issued in related AU application 2014227472 dated Feb. 13, 2015, 8 pages.
Hayashi, et al., "Solubilities Studies of Basic Amino Acids", 1966, Agr. Biol. Chem., vol. 30, No. 4, pp. 378-384.
European Search Report issued in related EP application 14187120.2 dated Apr. 29, 2015, 5 pages.
Second Examination Report issued in related AU application 2014227472 dated Sep. 10, 2015, 4 pages.
Extended European Search Report issued in related EP application 14187120.2 dated Nov. 12, 2015, 6 pages.
Das Gupta, et al., "Interaction of urea with weak acids and water", 1987, J. Phys. Chem., vol. 91, No. 22, pp. 5826-5832.
Liu, et al., "Acid Fracturing Technique for Carbonate Reservoirs Using Nitric Acid Powder", Jun. 2003, Canadian International Petroleum Conference, Paper 2003-007, 11 pages.

* cited by examiner

PREPARATION METHOD, FORMULATION AND APPLICATION OF CHEMICALLY RETARDED MINERAL ACID FOR OILFIELD USE

CROSS-REFERENCE TO RELATED APPLICATIONS

The present application is a continuation-in-part of U.S. Utility application Ser. No. 13/955,394 filed on Jul. 31, 2013 and U.S. Utility application Ser. No. 14/062,291 filed on Oct. 24, 2013, which are all incorporated herein by reference in their entirety.

BACKGROUND

Hydrocarbon fluids such as oil and natural gas are obtained from a subterranean geologic formation, commonly referred to as a reservoir, by drilling a well that penetrates the hydrocarbon-bearing formation. Once a wellbore is drilled, various forms of well completion components may be installed in order to control and enhance the efficiency of producing the various fluids from the reservoir. Well treatment methods often are used to increase hydrocarbon production by using a chemical composition or fluid, such as a treatment fluid.

Stimulation operations may be performed to facilitate production of fluids from subsurface formations by increasing the net permeability of a reservoir. There are two main stimulation techniques: matrix stimulation and fracturing. Matrix stimulation is accomplished, in sandstones, by injecting a fluid (e.g., acid or solvent) to dissolve and/or disperse materials that impair well production. Specifically, matrix stimulation may be performed (1) by injecting chemicals into the wellbore to react with and dissolve the damage and (2) by injecting chemicals through the wellbore and into the formation to react with and dissolve small portions of the formation to create alternative flowpaths for the hydrocarbon (e.g., instead of removing the damage, redirecting the migrating oil around the damage). In carbonate formations, the goal of matrix stimulation is to create new, unimpaired flow channels from the formation to the wellbore. Matrix stimulation, typically called matrix acidizing when the stimulation fluid is an acid, generally is used to treat the near-wellbore region. In a matrix acidizing treatment, the acid used (for example hydrochloric acid for carbonates) is injected at a pressure low enough to prevent formation fracturing. Fracturing involves injecting chemicals through the wellbore and into the formation at pressures sufficient to actually fracture the formation, thereby creating a large flow channel through which hydrocarbon can more readily move from the formation and into the wellbore.

One of the problems often encountered in the application of acids, especially inorganic acids, at elevated carbonate reservoir temperatures, is their excessive reaction rate toward carbonate originating from a lack of restriction to the mobility of the protons. Numerous approaches have been applied toward retarding the acid reactivity, mainly via physical means. For example, it is common in oilfield operations to encapsulate inorganic acid into shells of polymer gel, linear or crosslinked, or light oils in the presence of surfactant and/or chelating agent. Each of these options offers a certain level of performance, but at the same time brings several undesirable side effects.

At present, acid treatments are plagued by two primary limitations namely, limited radial penetration and severe corrosion to pumping and wellbore tubing. Both effects are associated with the higher-than-desired reaction rate (or spending rate) of acid, such as HCl, toward carbonate surface, in particular at higher temperatures. Limitations on radial penetration are caused by the fact that as soon as the acid, in particular mineral acid, is introduced into the formation or wellbore, it reacts instantaneously with the formation matrix and/or the wellbore scaling. In practice, the dissolution is so quick that the injected acid is spent by the time it reaches no more than a few inches beyond the wellbore, incapable of generating much desired fracture length far from the wellbore. Organic acids (e.g., formic acid, acetic acid and/or lactic acid and its polymeric version) are sometimes used to address limitations on radial penetration since organic acids react more slowly than mineral acids. Increasingly, retarded acid systems, which use techniques such as gelling the acid, oil-wetting the formation, or emulsifying the acid with oil, are used. Each of such alternative, however, has associated drawbacks and is an imperfect solution to limited radial penetration.

Other limitations related to the use of acids are: 1) very high miscibility of acids with water when the potential for undesirable migration of the acid-bearing fluid into a water-saturated zone is a concern; and 2) iron precipitation, especially in sour wells, where the iron sulfide scale formed in boreholes, tubulars, and/or formations is dissolved by the acid with the formation of hydrogen sulfide ($H_2S$) and undesirable iron precipitates such as ferric hydroxide or ferrous sulfide that affect the permeability of the formation. Therefore, acid treatment fluids often contain additives to minimize iron precipitation and $H_2S$ evolution, for example by sequestering the iron ions in solution, or by reducing ferric ions to the more soluble ferrous form of iron.

In general, the performance of an acid treatment job is measured by the length of the fracture that is effectively acidized. The distance a reactive acid travels along the fracture (e.g., acid penetration depth), is governed by the acid flow (injection) rate and the acid reaction (spending) rate at the rock surface. In most of the circumstances encountered in acid treatment, the reaction rate between acid and rock is very fast, and the rate determining step is acid mass transfer from bulk to rock surface.

Fracture acidizing is designed to open sustained flowpath network that connects limestone and/or dolomite reservoirs to the wellbore. In order to achieve deeper penetration in fracture acidizing, it is often desirable to retard the acid. Common approaches to acid retardation include gelling, emulsifying and to a minor extent chemical intervention. Each of these methodologies brings certain advantages that are invariably accompanied by a set of disadvantages. For example, gelled acids provide moderate retardation in the temperature range of 80 to 200° F. As gels exhibit high viscosity and low friction loss, they function primarily as diverting agents, contributing to fluid loss reduction. In addition, the use of an emulsified acid that is applied to the fracture acidizing treatment of limestone and dolomite up to 300° F. has the disadvantage of longer spending times and subsequent problems of cleaning due to the presence of residual oil. It is also common practice to retard acid using surfactants, although limited acid retardation is obtained. However, the deployment of surfactant also carries a few unwanted effects. For example, it could strip any existing coating on carbonate surfaces and as such act as an accelerator. Therefore, retardation schemes relying on surfactant films are often unreliable and ineffective. Furthermore, the attempt to use biodegradable, solid acid precursors such as polylactic acid in acidizing treatments has been plagued by the intrinsic disadvantage of very small acid capacity, leading to prohibitive costs and cumbersome dependency on formation temperature range which governs the rate of degradation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an aqueous composition, that includes a mineral acid, a fixing agent comprising at least one of an amine and/or amide containing compound having a dipole moment of at least 3 when in the aqueous composition, and water present in an amount sufficient to dissolve the mineral acid and the fixing agent.

In another aspect, embodiments of the present disclosure relate to a method for treating a formation in a subterranean well, that includes providing an oilfield treatment fluid including an aqueous composition to a high pressure pump, the aqueous composition comprising a mineral acid, a fixing agent and water present in an amount sufficient to dissolve the mineral acid and the fixing agent, wherein the fixing agent comprises at least one of an amine and/or an amide containing compound having a dipole moment of at least 3 when in the aqueous composition and operating the high pressure pump to treat at least one of a wellbore and the formation fluidly coupled to the wellbore.

DETAILED DESCRIPTION

Figure 1:
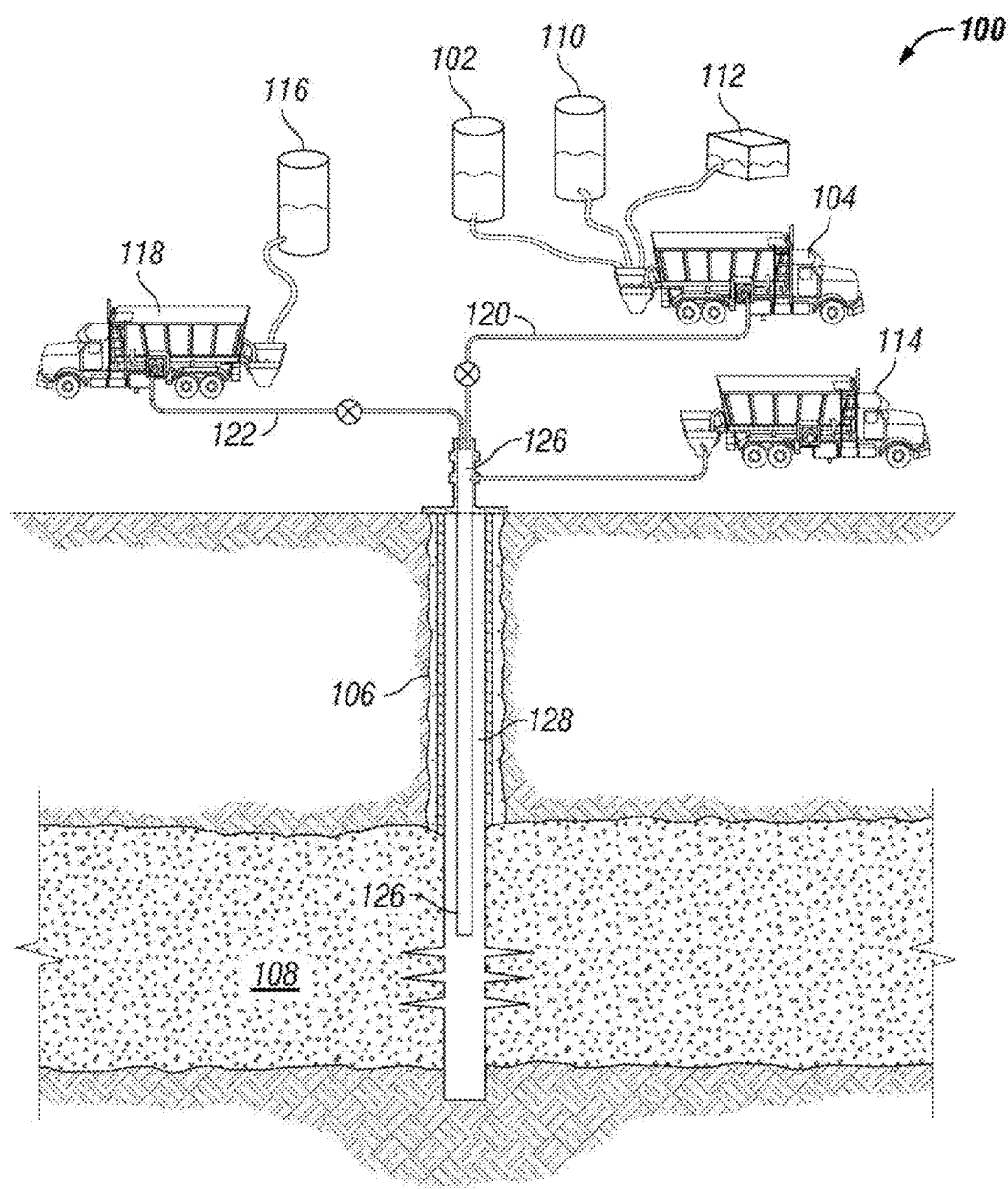
FIG. 1 depicts an example equipment to treat a wellbore and/or a formation fluidly coupled to the wellbore according to embodiments of the present disclosure.

Generally, embodiments disclosed herein relate to mineral acid based compositions and methods of using the same for enhancement of hydrocarbon production from reservoir formations, such as carbonate-bearing formations. Specifically, embodiments disclosed herein relate to aqueous compositions for downhole applications that include a mineral acid, a fixing agent and water present in an amount sufficient to dissolve the mineral acid and the fixing agent. The fixing agent includes a nitrogen-containing compound, such as amine and/or amide containing compounds, having a dipole moment of at least 3 when in the aqueous composition. The inventors of the present disclosure have found that the presence of a fixing agent in an aqueous composition used for the production of hydrocarbons from reservoirs far from the wellbore, via a fracturing treatment, may act as a retardation agent that can effectively slow down a mineral acid (such as hydrochloric acid) reaction rate (or intensity) towards a carbonate surface without compromising its strength or acid capacity. Specifically, upon binding the fixing agent with the formation of an adduct, the mineral acid may exhibit considerable and tunable retardation effect due to a substantial decrease of the mobility of the protons in the acid. In comparison to straight mineral acids of equal concentration level, the retarded acid may also exhibit a smaller HSE footprint being less corrosive to typical metallurgy.

The aqueous compositions of the present disclosure may incorporate a mineral acid. Examples of mineral acids are hydrochloric acid (HCl), nitric acid, phosphoric acid, sulfuric acid, hydrofluoric acid, hydrobromic acid, perchloric acid, or derivatives, and mixtures thereof. Generally, a mineral acid is transported to a wellsite. According to the present embodiments, the mineral acid may be present in the aqueous composition in a molar concentration of at least 1 mol %. Afterwards, the acid may be diluted to a treatment concentration before providing the oilfield treatment fluid to a high-pressure pump. The mineral acid that has shown particular utility in the aqueous composition of the present disclosure is hydrochloric acid.

In various embodiments, the aqueous composition may include an amount of hydrofluoric acid (HF). HF exhibits distinct reactions from HCl, and is useful in certain applications to enhance the activity of the resulting aqueous solution. For example, HF is utilized in the cleanup of sandstone formations where HCl alone is not effective for removing certain types of formation damage. It is believed that the present aqueous solution will complex with HF similarly to the observed effects with HCl. Accordingly, solutions can be formulated with a total acid amount that is much higher than presently attainable formulations. In yet another embodiment, the HF is present in the aqueous composition in an amount of at least 0.25% by weight. The HF may be present in addition to the amount of HCl, and/or as a substitution for an amount of the HCl.

Another component of the aqueous composition of this disclosure is a fixing agent or an acid retarder that has utility in retarding the rate at which the mineral acid solution reacts with carbonate-mineral surfaces inside the formation. Thus, a fixing agent may retard the reactivity of the mineral acid towards the carbonate-mineral surfaces, without compromising its acid capacity. Such retardation is useful in the context of stimulating or improving production from subterranean formations that contain hydrocarbons, steam, geothermal brines and other valuable materials as known in the art. Slowing the rate of reaction may allow deeper penetration of the acid into the subterranean formations than regular acid, thereby increasing the formation permeability and productivity. An acid retarder, as used herein, includes any material that reduces acid activity through a mechanism other than mere dilution. Non-limiting examples include chelating ligand based retarders, acid internal phase emulsions, and/or surfactant based retarders.

Fixing agents that have shown utility in the completion fluids of this disclosure are amine and/or amide containing compounds having a dipole moment of at least 3 when in the aqueous composition. In such an embodiment, the amine and/or amide containing compounds may also have a high dielectric constant, $\in$. Specifically, small amine or amide containing molecules react with a mineral acid such as hydrochloric acid, with the formation of an adduct that has a dipole moment of at least 3. Without being bound by theory, the inventors of the present application believe that the retardation effect exhibited by the fixing agent is due to the molecular interactions occurring between the nitrogen atoms in the amine or amide containing compound and the acidic proton in the mineral acid with the formation of an adduct that exhibits a high dipole moment. As discussed below, thermal stability tests showed that such an adduct does not decompose chemically, when the acid capacity may be compromised in the absence of the target acidizing substrate.

According to the present embodiments, the fixing agent is added to the aqueous composition in an amount up to its solubility limit in the aqueous composition. In various embodiments, the fixing agent and the mineral acid are present in a molar ratio that ranges from about 0.1 to about 2.0, where the lower limit can be any of 0.15, 0.2 0.25, 0.5, 0.75 or 1 and the upper limit can be any of 1, 1.25, 1.5, 1.7, 1.8, or 1.9, where any lower limit can be used with any upper limit. The selection of a molar ratio of fixing agent:HCl depends upon the specific embodiment.

In various embodiments, the amine containing compound may include an asymmetric primary, secondary, tertiary or a quaternary amine. While asymmetry in organic chemistry often refers to chirality, as used herein, this term refers to molecules having an unsymmetrical arrangement of atoms in a molecule, for example a nitrogen atom bonded to different atoms or groups such as diethylmethylamine, which is asymmetric as compared to the symmetric trimethylamine. One type of asymmetric amine containing compounds that have shown utility in the aqueous composition of the present disclosure are amino acids. The amino acid may comprise sarcosine, betaine (such as trimethyl glycine), dimethyl glycine (DMG), iminodiacetic acid (IDA), alanine, asparagine, aspartic acid, cysteine, glutamic acid, histidine, leucine, lysine, methionine, proline, serine, threonine or valine or combinations thereof. In such an embodiment, an upper limit of the amino acid is present as the solubility of the amino acid and HCl in the aqueous composition is reached, and that higher molecular weight fixing agent materials will provide lower molar ratios of amino acid:HCl at the highest HCl concentrations. In various embodiments, the amino acid is selected having a molecular weight below 100 g/mol. Additionally, the amino acid may have a molecular weight below 150 g/mol, below 175 g/mol, or greater than these values. In yet another embodiment, the amine containing compound may be an asymmetric protonated amine, such as, choline chloride. It is also envisioned that combinations of amine and/or amide containing compounds may be used as fixing agents.

In one or more embodiments, the amide containing compound is selected from the group of urea or urea derivatives. An example of a urea derivative includes any urea compound having at least one of the four nitrogen bonded hydrogens substituted. The substitution products may be anything, but include at least any hydrocarbon group, and may include substitutions on one or both of the urea nitrogens. Additionally, substitutions may include cyclic groups (e.g. ethylene urea), aromatic groups, and/or nitrogen containing hydrocarbon groups. The inclusion of a urea derivative in the present disclosure should not be read as limiting to other urea derivatives which may be used as an alternative or addition. In various embodiments, the urea derivatives may comprise 1,1-dimethylurea, 1,3-dimethylurea, 1,1-diethylurea, 1,3-diethylurea, 1,1-diallylurea, 1,3-diallylurea, 1,1-dipropylurea, 1,3-dipropylurea, 1,1-dibutylurea, 1,3-dibutylurea, 1,1,3,3-tetramethylurea, 1,1,3,3-tetraethylurea, 1,1,3,3-tetrapropylurea, 1,1,3,3-tetrabutylurea, ethyleneurea, propyleneurea, 1,3-dimethylpropyleneurea or 1,3-dimethylethyleneurea, or combinations thereof.

In one embodiment, the aqueous composition may include HCl in a weight fraction exceeding 37%. The fixing agent (FA) present in the aqueous composition allows the HCl fraction to exceed the 37% normally understood to be the limit of HCl solubility at atmospheric pressure. Above 37%, normally, the evolution of HCl gas from the solution prevents the HCl fraction from getting any higher. In one or more embodiments, the HCl weight fraction of the aqueous solution may be as high as 45.7 wt %. In one or more embodiments, the FA is selected to be 1,3-dimethyl urea and/or ethylene urea, and the HCl weight fraction of the aqueous solution is present at up to 41.1%.

A parameter that quantifies the retardation of the acid is the retardation factor. As described herein, the retardation factor indicates the ratio of apparent surface reaction rates. According to the present embodiments, the retardation factor of the aqueous composition is higher or equal to a retardation factor of a second solution of mineral acid of a same concentration as the mineral acid comprised in the aqueous composition without the fixing agent. For example, in various embodiments, the aqueous composition may exhibit an acid retardation factor higher than or equal to 2 at 20° C., or at least 3 or 5 in other embodiments. At 93° C., the composition may exhibit an acid retardation factor higher than or equal to 2.

Another component of the aqueous composition of the present disclosure is water present in an amount sufficient to dissolve the mineral acid and the fixing agent. According to the present embodiments, the water concentration included in the aqueous composition may be greater than 0 wt % and lower or equal to 80 wt %. In various embodiments, the water concentration may be lower than 60 wt %, or lower than 40 wt % or lower than 20 wt %. In yet other embodiments, the water concentration may even be lower than 10 wt %.

According to various embodiments, an amount of water is mixed with a fixing agent (FA), where the amount of water is present in an amount between 0.3 and 1.3 times the mass of the FA, where any lower limit can be 0.35, 0.4, or 0.45 and any upper limit can be 1.0, 1.2, 1.25, where any lower limit can be combined with any upper limit. The procedure further includes dissolving an amount of mineral acid into the combined amount of water and FA. The mineral acid, such as HCl, may be added by any method, such as bubbling HCl gas through the solution. The dissolving of the HCl may occur after dissolving of the FA, simultaneous with the dissolving of the FA, or at least partially before the dissolving of the FA. The amount of HCl gas is in a molar ratio of between 4.0 and 0.5 times the amount of the FA. The total amount of HCl gas dissolved into the aqueous solution may be greater than 37% by weight. In yet another embodiment, the procedure includes dissolution of at least a portion of the FA in the water during the dissolution of the HCl in the combined water and FA. Example operations include beginning the dissolution of the HCl and adding the FA as a solid or a solution, providing some of the FA in solution with the water and some of the FA as a solid, and/or providing the FA as a solid in the water and dissolving the HCl into the water while dissolving the FA.

Further, it is also within the scope of the present disclosure that the aqueous compositions of the present disclosure may be combined with one or more other additives, for instance, corrosion inhibitors, scale inhibitors, demulsifiers, reducing agents and/or chelants. For example, non-surface active substituted ammonium containing amino acid derivatives may be used as environmentally friendly corrosion inhibitors that effectively protect various tools employed in oilfield operations by surface treating these tools.

The corrosion inhibitor is typically provided in liquid form and is mixed with the other components of the treatment fluid at the surface and then introduced into the formation. The corrosion inhibitor system is present in the treatment fluid in an amount of from about 0.2% to about 3% by total weight of the treatment fluid. The corrosion inhibitor used with the fluids of the present disclosure includes an alkyl, alkenyl, alycyclic or aromatic substituted aliphatic ketone, which includes alkenyl phenones, or an aliphatic or aromatic aldehyde, which includes alpha, or beta-unsaturated aldehydes, or a combination of these. Alkyl, alycyclic or aromatic phenone and aromatic aldehyde compounds may also be used in certain applications. Other unsaturated ketones or unsaturated aldehydes may also be used. Alkynol phenone, aromatic and acetylenic alcohols and quaternary ammonia compounds, and mixtures of these may be used, as well. These may be dispersed in a suitable solvent, such as an alcohol, and may further include a dispersing agent and other additives.

Chelating agents are materials that are employed, among other uses, to control undesirable reactions of metal ions. In oilfield chemical treatments, chelating agents are frequently added to matrix stimulation acids to prevent precipitation of solids (metal control) as the acids spend on the formation being treated. These precipitates include iron hydroxide and iron sulfide. In addition, chelating agents are used as components in many scale removal/prevention formulations. Two different types of chelating agents may be used: polycarboxylic acids (including aminocarboxylic acids and polyaminopolycarboxylic acids) and phosphonates. The non-surface active substituted ammonium containing aminoacid derivatives may act as chelating agents when present in the treatment fluid in amount of from about 0.05% to about 10% or from about 1 wt % to about 5 wt %, based upon total weight percent of the treatment fluid.

One embodiment of the present disclosure involves a method for treating a formation in a subterranean well. In one such an illustrative embodiment, the method involves providing an oilfield treatment fluid including an aqueous composition to a high pressure pump and operating the high pressure pump to treat at least one of a wellbore and the formation fluidly coupled to the wellbore. Such an aqueous composition comprises a mineral acid, a fixing agent having a dipole moment of at least 3 when in the aqueous composition, and water. In an embodiment of the present disclosure, the aqueous composition is prepared by mixing a mineral acid, an amine and/or an amide containing compound that operates as a fixing agent and water present in an amount sufficient to dissolve the mineral acid and the fixing agent.

The operation of the pump may comprise at least one of (i) injecting the treatment fluid into the formation at matrix rates; (ii) injecting the treatment fluid into the formation at a pressure equal to a pressure that fractures the formation; and (iii) contacting at least one of the wellbore and the formation with the oilfield treatment fluid.

Referring now to FIG. 1, a system 100 used to treat a wellbore 106 and/or a formation 108 fluidly coupled to the wellbore 106 is depicted. The formation 108 may be any type of formation with a bottom hole temperature up to about 204° C. (400° F.). In various embodiments the temperature is at least 38° C. (100° F.). The temperature may also range from about 38° C. to about 204° C. The wellbore 106 is depicted as a vertical, cased and cemented wellbore 106, having perforations providing fluid communication between the formation 108 and the interior of the wellbore 106. However, the particular features of the wellbore 106 are limiting, and the example provides an example context 100 for a procedure.

The system 100 includes a high-pressure pump 104 having a source of an aqueous composition 102. In a first example, the aqueous composition 102 includes a FA and HCl, the HCl in an amount between 8 wt % and 28 wt % inclusive, and the FA present in a molar ratio between 0.2 and 1.5 inclusive. The aqueous composition 102 further includes water in an amount sufficient to dissolve the acid and the FA. The high pressure pump 104 is fluidly coupled to the wellbore 106, through high pressure lines 120 in the example. The example system 100 includes a tubing 126 in the wellbore 106. The tubing 126 is optional and non-limiting. In various embodiments, the tubing 106 may be omitted, a coiled tubing unit (not shown) may be present, and/or the high pressure pump 104 may be fluidly coupled to the casing or annulus 128. The tubing or casing may be made of steel.

Certain additives (not shown) may be added to the aqueous composition 102 to provide an oilfield treatment fluid. Additives may be added at a blender (not shown), at a mixing tub of the high pressure pump 104, and/or by any other method. In one or more embodiments, a second fluid 110 may be a diluting fluid, and the aqueous composition 102 combined with some amount of the second fluid 110 may make up the oilfield treatment fluid. The diluting fluid may contain no acid, and/or acid at a lower concentration than the aqueous composition 102. The second fluid 110 may additionally include any other materials to be added to the oilfield treatment fluid, including additional amounts of an FA. In certain embodiments, an additional FA solution 112 is present and may be added to the aqueous composition 102 during a portion when the aqueous composition 102 is being utilized. The additional FA solution 112 may include the same or a different FA from the aqueous composition 102, and/or may include FA at a distinct concentration from the aqueous composition.

The high-pressure pump 104 can treat the wellbore 106 and/or the formation 108, for example by positioning fluid therein, by injecting the fluid into the wellbore 106, and/or by injecting the fluid into the formation 108. Example and non-limiting operations include any oilfield treatment without limitation. Potential fluid flows include flowing from the high-pressure pump 104 into the tubing 126, into the formation 108, and/or into the annulus 128. The fluid may be recirculated out of the well before entering the formation 108, for example utilizing a back side pump 114. Referring still to FIG. 1, the annulus 128 is shown in fluid communication with the tubing 126. In various embodiments, the annulus 128 and the tubing 126 may be isolated (e.g. with a packer). Another example fluid flow includes flowing the oilfield treatment fluid into the formation at a matrix rate (e.g. a rate at which the formation is able to accept fluid flow through normal porous flow), and/or at a rate that produces a pressure exceeding a hydraulic fracturing pressure. The fluid flow into the formation may be either flowed back out of the formation, and/or flushed away from the near wellbore area with a follow up fluid. Fluid flowed to the formation may be flowed to a pit or containment (not shown), back into a fluid tank, prepared for treatment, and/or managed in any other manner known in the art. Acid remaining in the returning fluid may be recovered or neutralized.

Another example fluid flow includes the aqueous composition 102 including an acid and FA. The example fluid flow includes a second aqueous solution 116 including FA (amino acids, urea or a urea derivative). The fluid flow includes, sequentially, a first high pressure pump 104 and a second high pressure pump 118 treating the formation 108. As seen in FIG. 1, the second high-pressure pump 118 is fluidly coupled to the tubing 126 through a second high pressure line 122. The fluid delivery arrangement is optional and non-limiting. In one embodiment, a single pump may deliver both the aqueous solution 102 and the second aqueous solution 116. In yet another example, either the first aqueous solution 102 or the second aqueous solution 116 may be delivered first, and one or more of the solutions 102, 116 may be delivered in multiple stages, including potentially some stages where the solutions 102, 116 are mixed.

The term "formation" as utilized herein should be understood broadly. A formation includes any underground fluidly porous formation, and can include without limitation any oil, gas, condensate, mixed hydrocarbons, paraffin, kerogen, water, and/or $CO_2$ accepting or providing formations. A formation can be fluidly coupled to a wellbore, which may be an injector well, a producer well, and/or a fluid storage well. The wellbore may penetrate the formation vertically, horizontally, in a deviated orientation, or combinations of these. The formation may include any geology, including at least a sandstone, limestone, dolomite, shale, tar sand, and/or unconsolidated formation. The wellbore may be an individual wellbore and/or a part of a set of wellbores directionally deviated from a number of close proximity surface wellbores (e.g. off a pad or rig) or single initiating wellbore that divides into multiple wellbores below the surface.

As described herein, the term "oilfield treatment fluid" refers to any fluid used in a subterranean operation, in conjunction with a desired function and/or for a desired purpose. In one or more embodiments, an oilfield treatment fluid includes any fluid having utility in an oilfield type application, including a gas, oil, geothermal, or injector well. In various embodiments, an oilfield treatment fluid includes any fluid having utility in any formation or wellbore described herein. In yet other embodiments, an oilfield treatment fluid includes a matrix acidizing fluid, a wellbore cleanup fluid, a pickling fluid, a near wellbore damage cleanup fluid, a surfactant treatment fluid, an unviscosified fracture fluid (e.g., slick water fracture fluid), and/or any other fluid consistent with the fluids otherwise described herein. An oilfield treatment fluid may include any type of additive known in the art, which are not listed herein for purposes of clarity of the present description, but which may include at least friction reducers, inhibitors, surfactants and/or wetting agents, fluid diverting agents, particulates, acid retarders (except where otherwise provided herein), organic acids, chelating agents, energizing agents (e.g. $CO_2$ or $N_2$), gas generating agents, solvents, emulsifying agents, flowback control agents, resins, breakers, and/or non-polysaccharide based viscosifying agents.

The term "high pressure pump" as utilized herein should be understood broadly. In one or more embodiments, a high pressure pump includes a positive displacement pump that provides an oilfield relevant pumping rate, for example at least 80 L/min (0.5 bbl/min or bpm), although the specific example is not limiting. A high pressure pump includes a pump capable of pumping fluids at an oilfield relevant pressure, including at least 3.5 MPa (500 psi), at least 6.9 MPa (1,000 psi), at least 13.8 MPa (2,000 psi), at least 34.5 MPa (5,000 psi), at least 68.9 MPa (10,000 psi), up to 103.4 MPa (15,000 psi), and/or at even greater pressures. Pumps suitable for oilfield cementing, matrix acidizing, and/or hydraulic fracturing treatments are available as high pressure pumps, although other pumps may be utilized.

The term "treatment concentration" as utilized herein should be understood broadly. A treatment concentration in the context of an HCl concentration is a final concentration of the fluid before the fluid is positioned in the wellbore and/or the formation for the treatment. The treatment concentration may be the mix concentration available from the HCl containing fluid at the wellsite or other location where the fluid is provided from. The treatment concentration may be modified by dilution before the treating and/or during the treating. Additionally, the treatment concentration may be modified by the provision of additives to the fluid. Non-limiting treatment concentrations may include 7.5 wt %, 15 wt %, 20 wt %, 28 wt %, 36 wt %, and/or up to 45.7 wt % HCl concentration in the fluid. In one or more embodiments, a treatment concentration is determined upstream of additives deliver (e.g., at a blender, hopper, or mixing tub) and the concentration change from the addition of the additives is ignored. In yet other embodiment, the treatment concentration is a liquid phase or acid phase concentration of a portion of the final fluid, for example when the fluid is an energized or emulsified fluid. In yet another embodiment the treatment concentration may exceed 15 wt %.

The following examples are presented to further illustrate the preparation and properties of the wellbore fluids of the present disclosure and should not be construed to limit the scope of the disclosure, unless otherwise expressly indicated in the appended claims.

The aqueous compositions of the present disclosure exhibit a retarded reactivity that facilitates fracture or greater depth. In addition, the aqueous composition of the present disclosure has also the advantage of reduced risk of corrosion to metallic tubing and completions.

EXAMPLES

Various formulations were prepared using different fixing agents and HCl. A series of tests were conducted to evaluate these formulations.

To fully assess the properties of the prepared formulations, the thermal stability was measured. The thermal stability tests were conducted in an autoclave under up to 3000 psi hydrostatic pressure, with the thermal energy transmitted through a silicone oil bath. The fluids were loaded into the oil bath pre-heated to 140° F., and then went through the heating process till the target temperature. The fluids were maintained at the target temperature for a period of two hours before being cooled down. After retrieval, the fluids were titrated against 10% NaOH in the presence of phenolsulfonphthalein indicator. The resultant HCl concentrations unambiguously confirm the thermal stability of the modified HCl system. Table 1 below presents results of the thermal stability tests for formulations of various amino acids:HCl molar ratios.

TABLE 1

Thermal stability tests results

| No. | Fluid | [HCl] % by titration |
| --- | --- | --- |
| 1 | 15% HCl - 3.7% Sarcosine (1-0.1) | 15.1 |
| 2 | 15% HCl - 7.4% Sarcosine (1-0.2) | 15.3 |
| 3 | 15% HCl - 18.5% Sarcosine (1-0.5) | 15.2 |
| 4 | 15% HCl - 5.7% Choline Chloride (1-0.1) | 15.2 |
| 5 | 15% HCl - 11.4% Choline Chloride (1-0.2) | 15.3 |
| 6 | 15% HCl - 28.7% Choline Chloride (1-0.5) | 15.1 |
| 7 | 15% HCl - 4.8% Betaine (1-0.1) | 15.4 |
| 8 | 15% HCl - 9.6% Betaine (1-0.2) | 15.3 |
| 9 | 15% HCl - 24.1% Betaine (1-0.5) | 16.5 |

The corrosion performance tests of the aqueous compositions of the present disclosure were conducted in an autoclave under up to 3000 psi hydrostatic pressure, with the thermal energy transmitted through a silicone oil bath. The aqueous compositions containing a corrosion inhibitor package including a high temperature corrosion inhibitor, and an inhibitor aid, as recommended for oilfield use, were loaded into the oil bath pre-heated to 140° F. The corrosion inhibitor package was applied in order to avoid the replacement of expensive equipment. The fluids were put in contact with a typical oilfield metallurgy N80 and afterwards heated to the target temperature. The fluids were maintained at the target temperature for a period of two hours before being cooled down. After retrieval, the fluids were titrated against 10% NaOH in the presence of phenolsulfonphthalein indicator. The resultant HCl concentrations unambiguously confirm the thermal stability of the modified HCl system. The metal coupon was analyzed for pitting index and corrosion rate. As shown in the results summarized below in Table 2, in the presence of a typical corrosion inhibitor package (such as an acid corrosion inhibitor, ACI), the aqueous compositions exhibit pitting index and corrosion rate that are well within the tolerance range for the oilfield industry. The post run titration results demonstrate that these fluids effectively retain the acid capacity that was initially designed, which ensures the genuine pitting index and corrosion rate. In turn, it also enables high temperature application of these aqueous compositions.

TABLE 2

Corrosion performance test results

| No | Fluid | PI | Corrosion Rate lb/ft$^2$ | [HCl] % by titration |
|---|---|---|---|---|
| 1 | 15% HCl - 4.2% DMG - 1% ACI1 - 2% ACI2 | 0 | 0.0062 | 17.1 |
| 2 | 15% HCl - 4.2% DMG - 1% ACI1 - 3% ACI2 | 0 | 0.0060 | 17.5 |
| 3 | 15% HCl - 8.4% DMG - 1% ACI1 - 3% ACI2 | 0 | 0.0061 | 17.7 |
| 4 | 15% HCl - 8.4% DMG - 1% ACI1 - 2% ACI2 | 0 | 0.0070 | 17.9 |
| 5 | 15% HCl - 3.7% Sarcosine - 1% ACI1 - 2% ACI2 | 0 | 0.0036 | 17.2 |
| 6 | 15% HCl - 7.4% Sarcosine - 1% ACI1 - 2% ACI2 | 0 | 0.0035 | 17.3 |
| 7 | 15% HCl - 18.5% Sarcosine - 1% ACI1 - 2% ACI2 | 0 | 0.0043 | 17.0 |
| 8 | 15% HCl - 5.7% Choline chloride - 1% ACI1 - 3% ACI2 | 1 | 0.0048 | 17.4 |
| 9 | 15% HCl - 11.4% Choline chloride - 1% ACI1 - 3% ACI2 | 1 | 0.0055 | 17.3 |
| 10 | 15% HCl - 28.7% Choline chloride - 1% ACI1 - 3% ACI2 | 1 | 0.0088 | 17.1 |
| 11 | 15% HCl - 4.8% Betaine - 1% ACI1 - 3% ACI2 | 1 | 0.0051 | 16.9 |
| 12 | 15% HCl - 9.6% Betaine - 1% ACI1 - 3% ACI2 | 0 | 0.0052 | 17.3 |
| 13 | 15% HCl - 24.1% Betaine - 1% ACI1 - 3% ACI2 | 0 | 0.0062 | 17.3 |
| 14 | 15% HCl - 5.5% IDA - 1% ACI1 - 3% ACI2 | 0 | 0.0057 | 18.6 |

To further demonstrate the performance of the aqueous compositions formulated in accordance with the teachings of the present disclosure, the retardation factor of various formulations was evaluated. The tests involved a ServoDyne electronic mixer assembled with a stainless steel rod and a cylindrical Teflon attachment. At the bottom of the cylinder, a 7.1 g Indiana limestone disk was attached using epoxy glue. The glue was allowed to cure, then it was dried for 10-15 minutes. Next, a metal rod was inserted into the motor, with the Teflon attachment oriented downward. A plastic 400 mL beaker was placed underneath the core, leaving about a quarter inch of space underneath the core. A volume of 100 g of test fluid was placed into the beaker. The motor was tuned to 200 rpm and take fluid sample at one minute interval up to 5 minutes. The samples were analyzed for calcium concentration by inductively coupled plasma atomic emission spectroscopy (ICP-AES) after 1:10 dilution using water. The calcium concentrations at individual moments were used to estimate the reaction rate. As can be seen in Table 3, a variety of FA and HCl concentrations provide for considerable retardation of the HCl activity over HCl without a FA present.

TABLE 3

Retardation factors of various formulations

| No. | Fluid | Retardation factor |
|---|---|---|
| 1 | 15% HCl | 1.0 |
| 2 | 15% HCl - 31.2% Glycine | 5.8 |
| 3 | 15% HCl - 15.6% Glycine | 2.1 |
| 4 | 15% HCl - 3.1% Glycine | 1.7 |
| 5 | 15% HCl - 36.7% Sarcosine | 11.6 |
| 6 | 15% HCl - 18.3% Sarcosine | 3.4 |
| 7 | 15% HCl - 3.7% Sarcosine | 1.8 |
| 8 | 15% HCl - 42.4% DMG | 12.5 |
| 9 | 15% HCl - 21.2% DMG | 4.5 |
| 10 | 15% HCl - 4.2% DMG | 1.8 |
| 11 | 15% HCl - 24.1% Betaine | 4.4 |
| 12 | 15% HCl - 4.8% Betaine | 1.6 |
| 13 | 15% HCl - 47.3% Choline chloride | 11.5 |
| 14 | 15% HCl - 28.1% Choline chloride | 2.1 |
| 15 | 15% HCl - 5.7% Choline chloride | 1.7 |
| 16 | 15% HCl - 5.5% IDA | 1.9 |

Referring now to Table 4, the experimental and computed dipole moments, as well as the permittivities of non-surface active polar compounds are presented herein. Dipole moments of a series of small molecules, taken from CRC Handbook of Chemistry and Physics, 90 Ed., and/or calculated in gas phase using the semi-empirical quantum chemistry method PM3, by HyperChem software package (ver. 8.0.10 by HyperCube, Inc.), are presented in the Table 4 below. Protonated forms are also shown for certain compounds, which are assumed to be protonated in concentrated solutions of strong mineral acids. Several nitrogen containing compounds demonstrate increase of dipole moment in their protonated form. As can be seen from Table 4, urea, and amino acids such as glycine, betaine, and choline (which show remarkable retardation), have dipole moments higher than those of water or hydrogen chloride. It is generally known that dissolution of high dipole moment molecules increases relative permittivity of solutions. Therefore, the observed retardation phenomenon on HCl reactivity may be attributed to the effect of polar non-surface active additives, since small amine-containing molecules, or other species with high dipole moment, increase the relative permittivity (dielectric constant) of acidizing fluids. The higher relative permittivity can increase the solubility of HCl, due to the enhanced degree of the acid dissociation. The higher solubility can further explain noticeable retardation of the heterogeneous reaction of calcium carbonate dissolution, as would change HCl speciation between interfacial layer and solution in favor of the latter. In other words, the addition of HCl to an amino acid creates a modified acetic acid, which inherently has a lower reaction rate.

TABLE 4

Experimental and calculated dipole moments and relative permittivities (dielectric constants) of non-surface active polar compounds

| Name | μ, D Experiment | μ, D Calculated (PM3) | ε |
|---|---|---|---|
| Water | 1.85 | 1.74 | 80 |
| Hydrogen chloride | 1.11 | 1.38 | |
| Formamide | 3.73 | 3.48 | 111 |
| N-methylformamide | 3.83 | 3.54 | 189 |
| N,N-dimethylformamide | 3.82 | 3.46 | 37 |
| Acetamide | 3.68 | 3.58 | 68 |
| N-Methylacetamide | 4.30 | 3.41 | |
| N,N-Dimethylacetamide | 3.70 | 3.17 | |
| Urea | 4.56 | 4.07 | |
| Tetramethylurea | 3.50 | 2.55 | 23 |
| Biuret | | 6.85 | |
| Glycine (zwitter) | 5.45 | 10.50 | |
| Glycine-H+ (protonated) | | 7.90 | |
| Choline+ | | 4.08 | |
| Sarcosine (zwitter) | | 11.81 | |
| Sarcosine-H+ (protonated) | | 6.59 | |
| Dimethylglycine | | 12.07 | |
| Dimethylglycine + H+ (protonated) | | 5.69 | |
| Betaine (zwitter) | | 11.31 | |
| Betaine-H+ (protonated) | | 5.73 | |
| Iminodiacetic acid | | 3.33 | |
| Iminodiacetic acid-H+ (protonated) | | 3.81 | |
| Sulfamic acid (zwitter) | | 6.10 | |
| N-methylmorpholine N-oxide | | 4.38 | |
| 2-Pyrrolidone | | 3.52 | 28 |
| N-Methyl-2-pyrrolidone | 4.10 | 3.30 | 32 |
| Dimethyl sulfoxide | 3.96 | 4.49 | 47 |
| Propylene carbonate | 4.90 | 4.81 | 66 |
| Sulfolane | 4.80 | 4.98 | |
| Hexamethylphosphoramide | 5.54 | 3.01 | 31 |
| Phenol | 1.22 | 1.14 | 12 |
| Phenol-H+ (protonated) | | 6.17 | |
| Aniline | 1.13 | 1.57 | 7 |
| Aniline-H+ (protonated) | | 7.58 | |
| Pyrrole | 1.77 | 1.46 | 8 |
| Pyrrole-H+ (protonated) | | 4.07 | |
| Imidazole | 3.80 | 3.86 | |
| Benzenesulfonic acid | | 4.29 | |
| p-Toluenesulfonic acid | | 4.53 | |
| Nitrobenzene | 4.22 | 5.25 | |
| Isethionic acid | | 3.73 | |
| Caprolactam | 3.90 | 3.51 | |
| γ-Butyrolactone | 4.27 | 4.23 | 39 |

Figure 2:
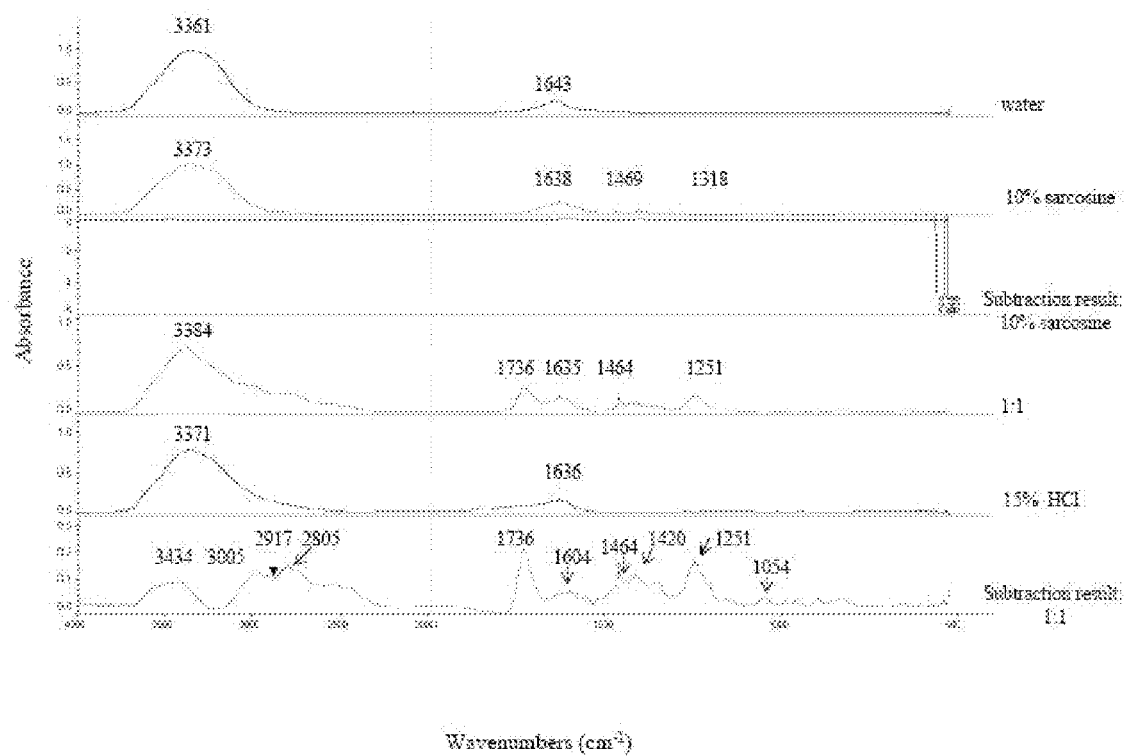
FIG. 2 shows IR spectra of aqueous compositions according to embodiments of the present disclosure.

To further demonstrate the role of the fixing agent as an acid retarder, FTIR spectra of various formulations HCl:FA were acquired on a Nicolet 6500 spectrometer using attenuated total reflection mode. Referring now to FIG. 2, in comparison to the FA itself, the binding with HCl clearly shows a general trend of causing the enhancement, and a remarkable shift of both amine and carboxylic groups in either bending or stretching configuration. This provides unambiguous evidence of chemical bond formation between the two species. This is also indicated by an analysis of the pKa values of HCl and amino acids.

Advantageously, embodiments of the present disclosure provide aqueous compositions used for enhancement of hydrocarbon production from carbonate-bearing formations. Specifically, the reaction rate of the mineral acid towards a carbonate surface is reduced due to the formation of an adduct between the fixing agent present in the aqueous composition and the mineral acid, without compromising the strength or acid capacity. In addition, the aqueous compositions as described herein increases the penetration depth and also have low corrosive effects upon metals such as iron, steel (including carbon steel), and may provide reduced environmental risks. As noted above, the aqueous compositions of the present disclosure are stable, the adduct formed between the mineral acid and the fixing agent being stable at the operating temperature.

Although only a few example embodiments have been described in detail above, those skilled in the art will readily appreciate that many modifications are possible in the example embodiments without materially departing from this invention. Accordingly, all such modifications are intended to be included within the scope of this disclosure. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed:

1. A method for treating a formation in a subterranean well, comprising:
   providing an oilfield treatment fluid including an aqueous composition to a high pressure pump, the aqueous composition comprising a mineral acid, a fixing agent and water present in an amount sufficient to dissolve the mineral acid and the fixing agent, wherein the fixing agent comprises at least one of an amine containing compound or an amide containing compound or both, having a dipole moment of at least 3 when in the aqueous composition, and wherein the oilfield treatment fluid is not an emulsion;
   forming an adduct arising from molecular interactions between nitrogen atoms in the amine containing compound or amide containing compound and an acidic proton in the mineral acid; and
   operating the high pressure pump to treat at least one wellbore and the formation fluidly coupled to the wellbore.

2. The method of claim 1, further comprising preparing the aqueous composition by dissolving the mineral acid and the fixing agent in water, wherein the dissolving of the mineral acid occurs after dissolving of the fixing agent, simultaneous with the dissolving of the fixing agent, or at least partially before the dissolving of the fixing agent.

3. The method of claim 2, wherein the mineral acid is hydrochloric acid.

4. The method of claim 2, wherein a retardation factor of the aqueous composition is higher than or equal to 2.

5. The method of claim 1, wherein the mineral acid is present in a molar concentration of at least 1 mol %.

6. The method of claim 1, wherein the fixing agent and the mineral acid are present in a molar ratio of the fixing agent to the mineral acid that ranges from about 0.1 to about 2.0.

7. The method of claim 1, wherein the fixing agent comprises the amine containing compound, and the amine containing compound is an asymmetric amine selected from the group consisting of sarcosine, choline chloride, betaine, dimethyl glycine, iminodiacetic acid and combinations thereof.

8. The method of claim 1, wherein the fixing agent comprises the amide containing compound, and the amide containing compound is selected from the group consisting of urea or urea derivatives.

9. The method of claim 1, wherein the fixing agent is added in an amount up to its solubility limit in the aqueous composition.

10. The method of claim 1, wherein the aqueous composition is pumped into the at least one wellbore at a rate sufficient to permeate the formation without formation of a fracture.

* * * * *